E. G. WILLIAMS & E. H. BROWN.
METHOD OF AND APPARATUS FOR TUNNEL WORK.
APPLICATION FILED JULY 15, 1907.
1,156,830. Patented Oct. 12, 1915.
14 SHEETS—SHEET 3.
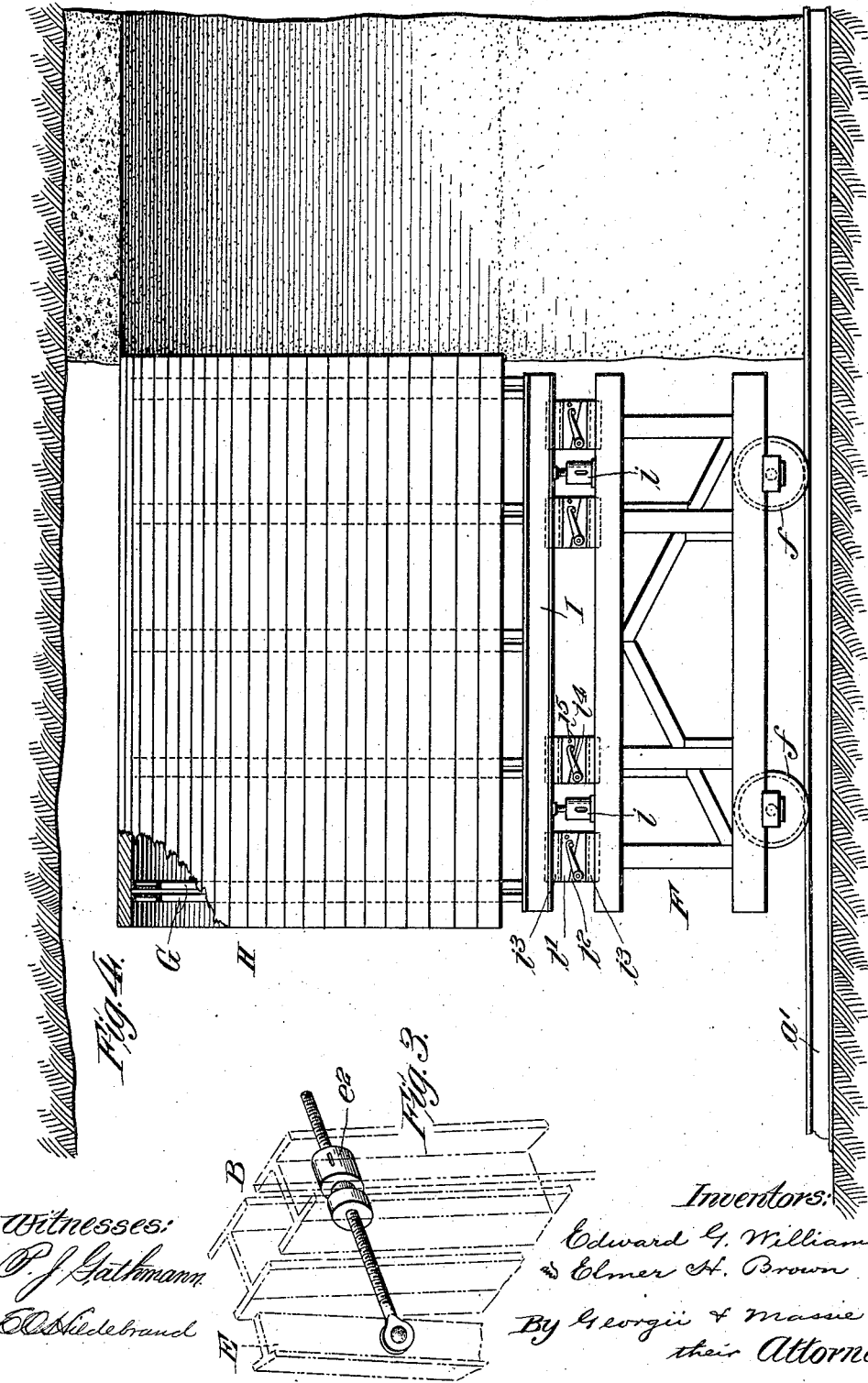

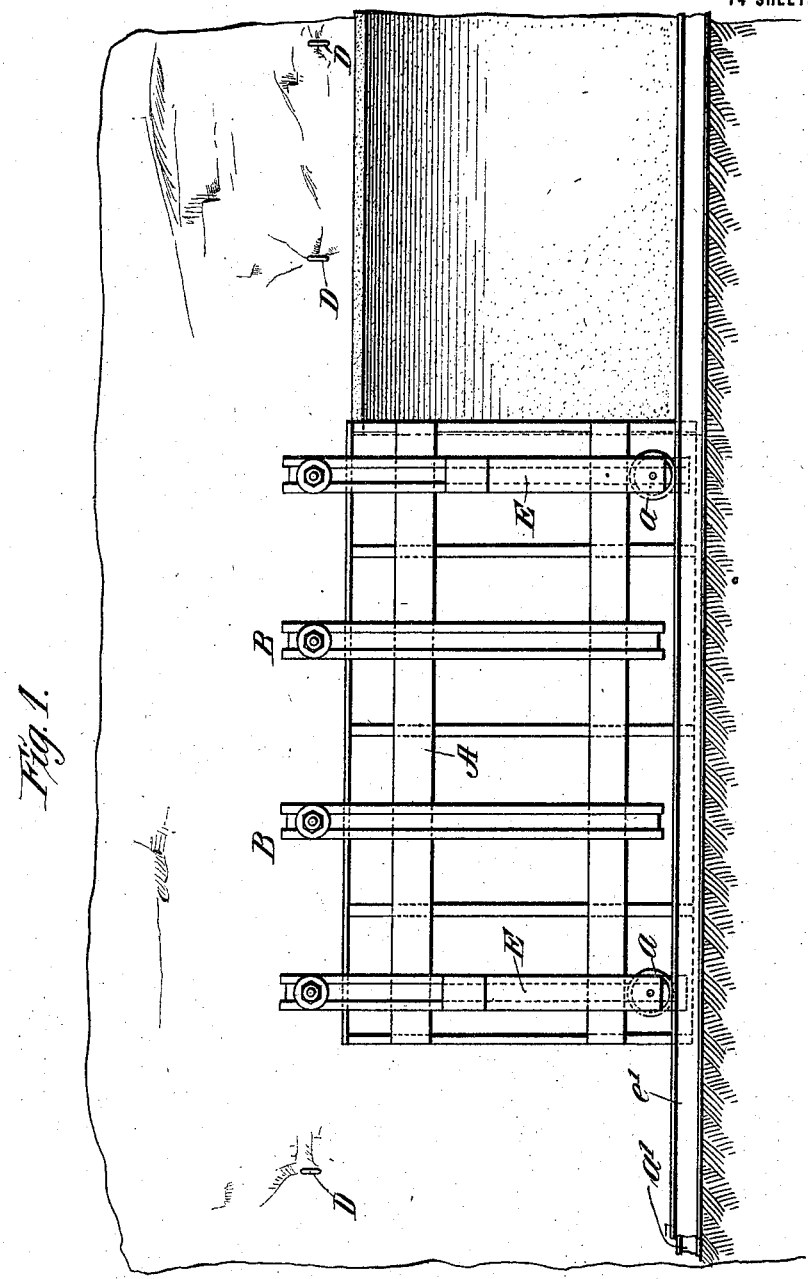

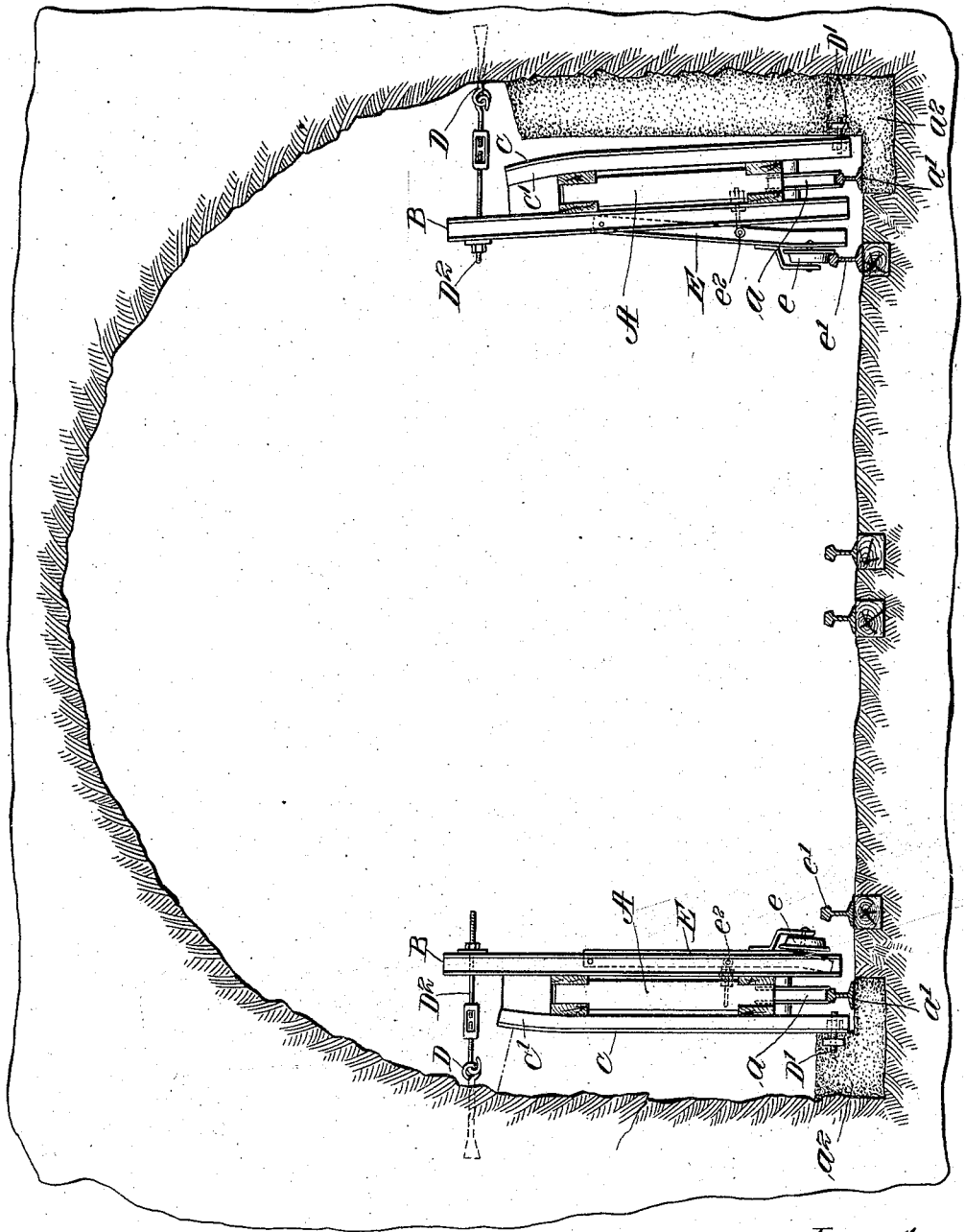

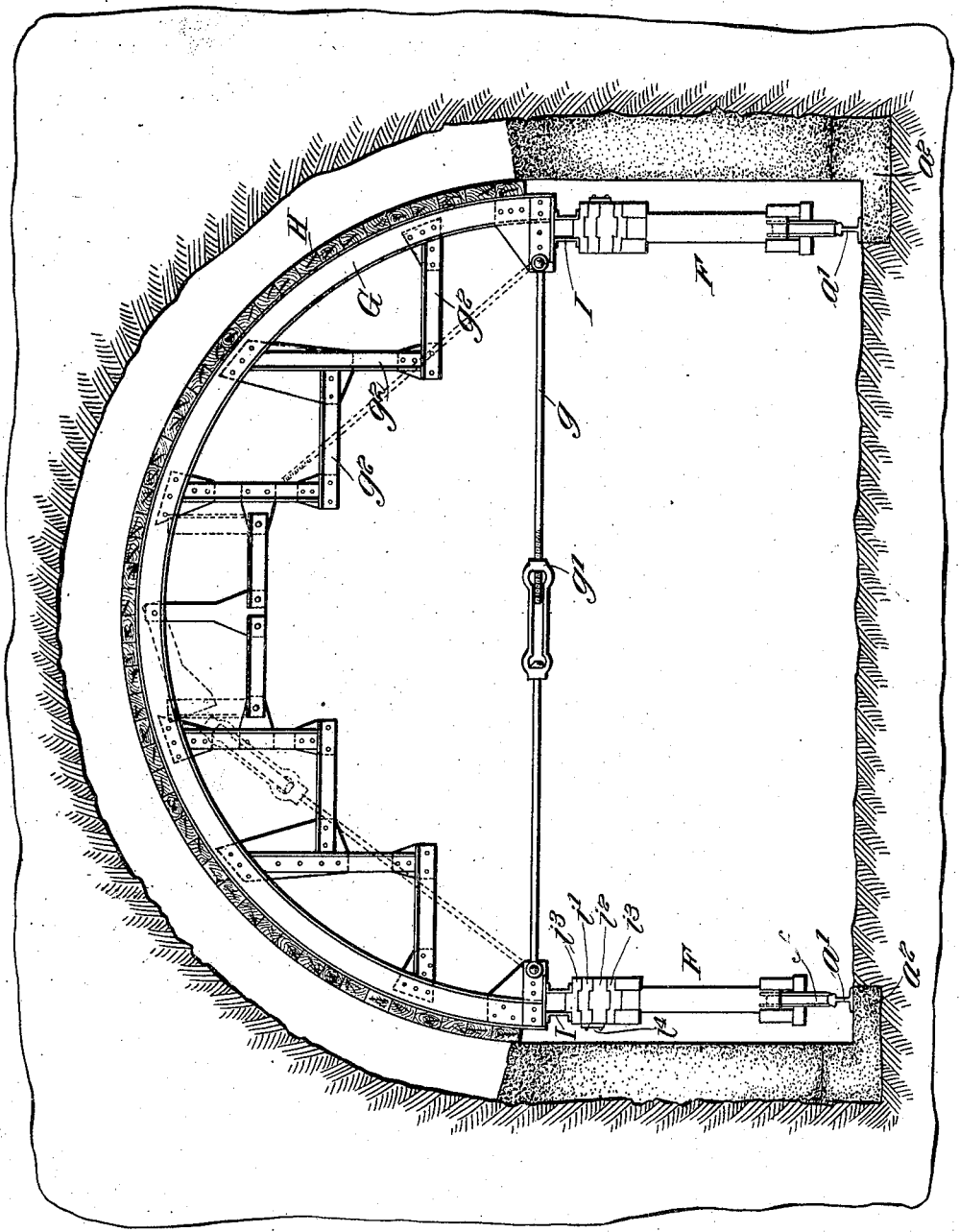

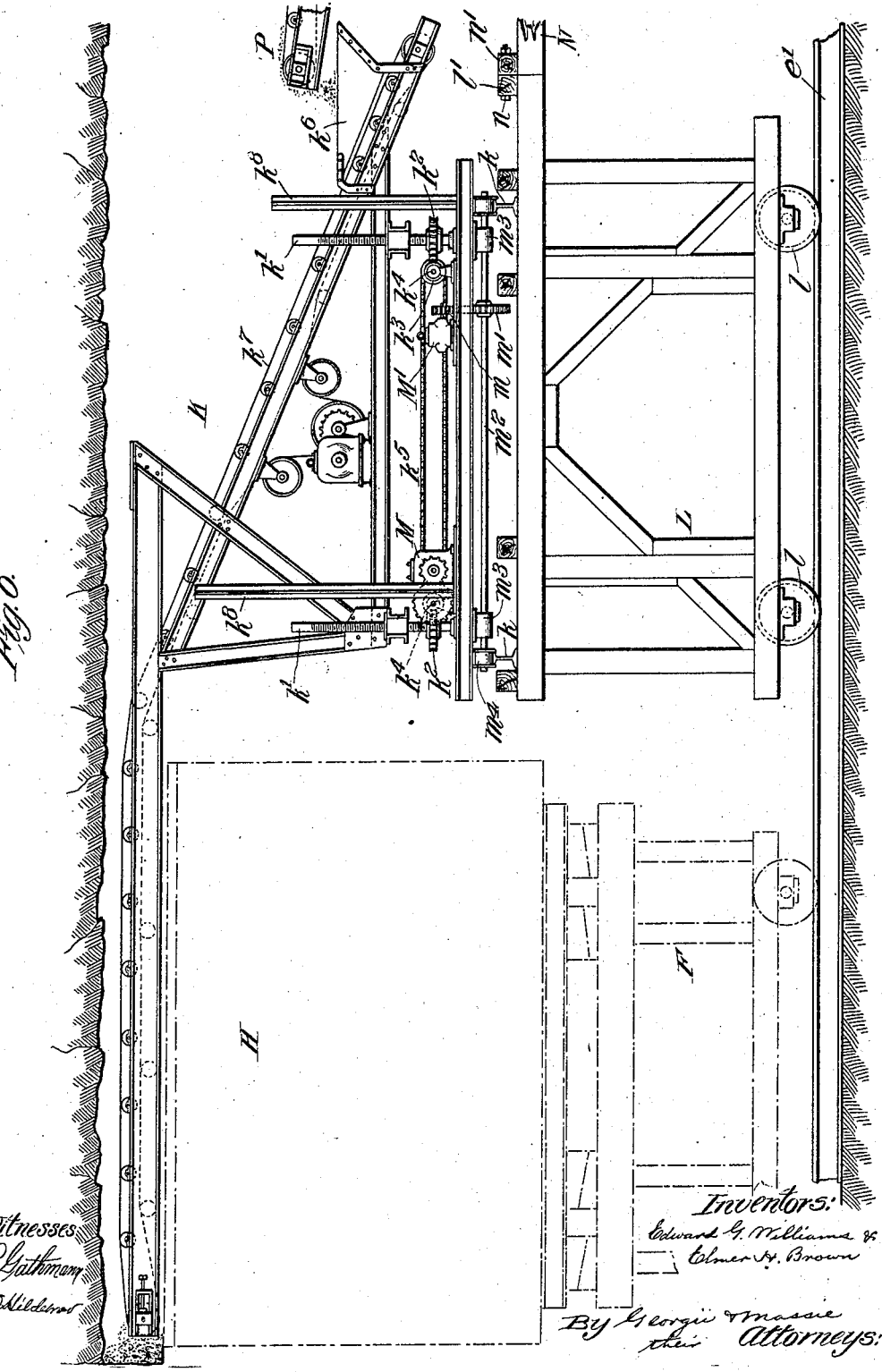

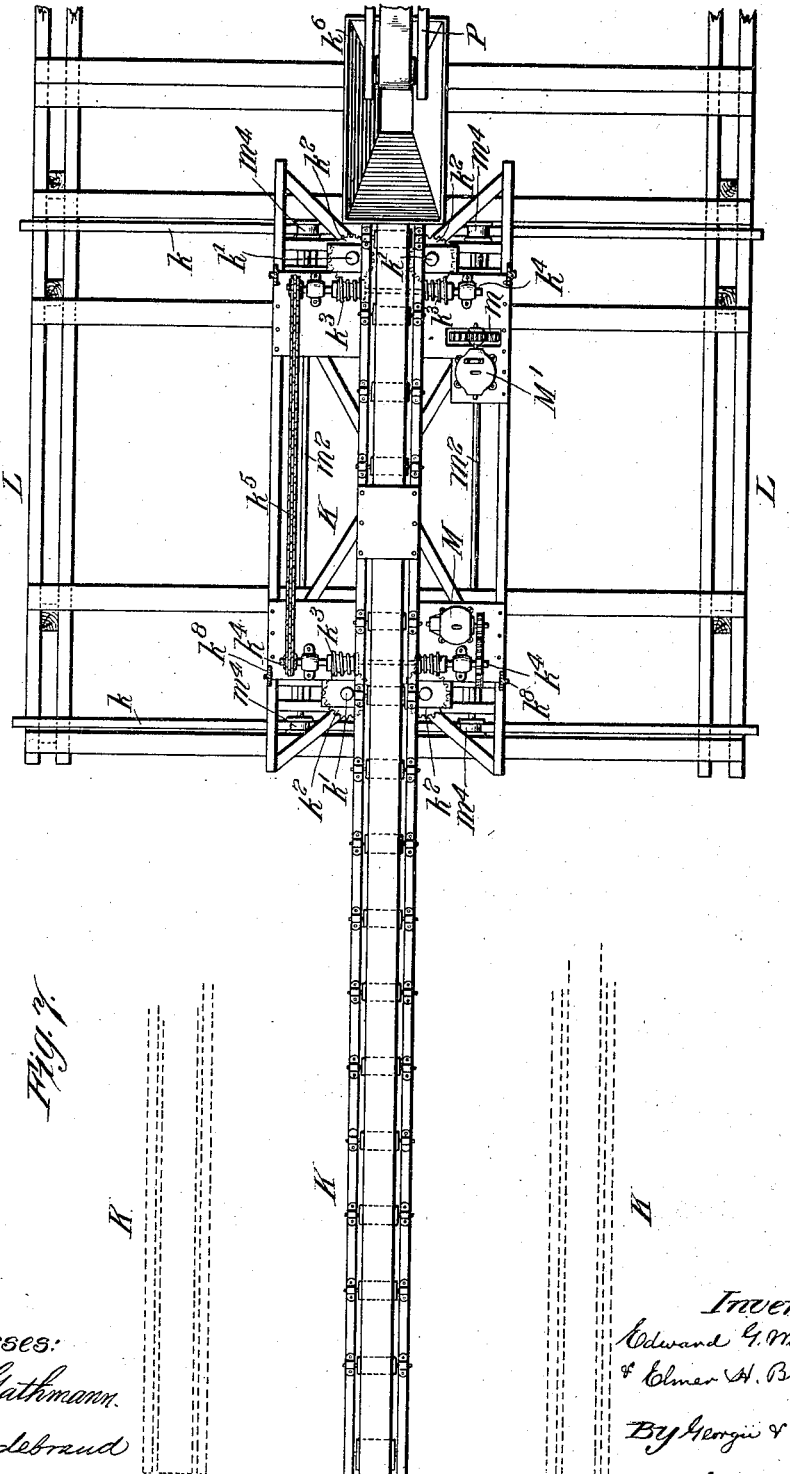

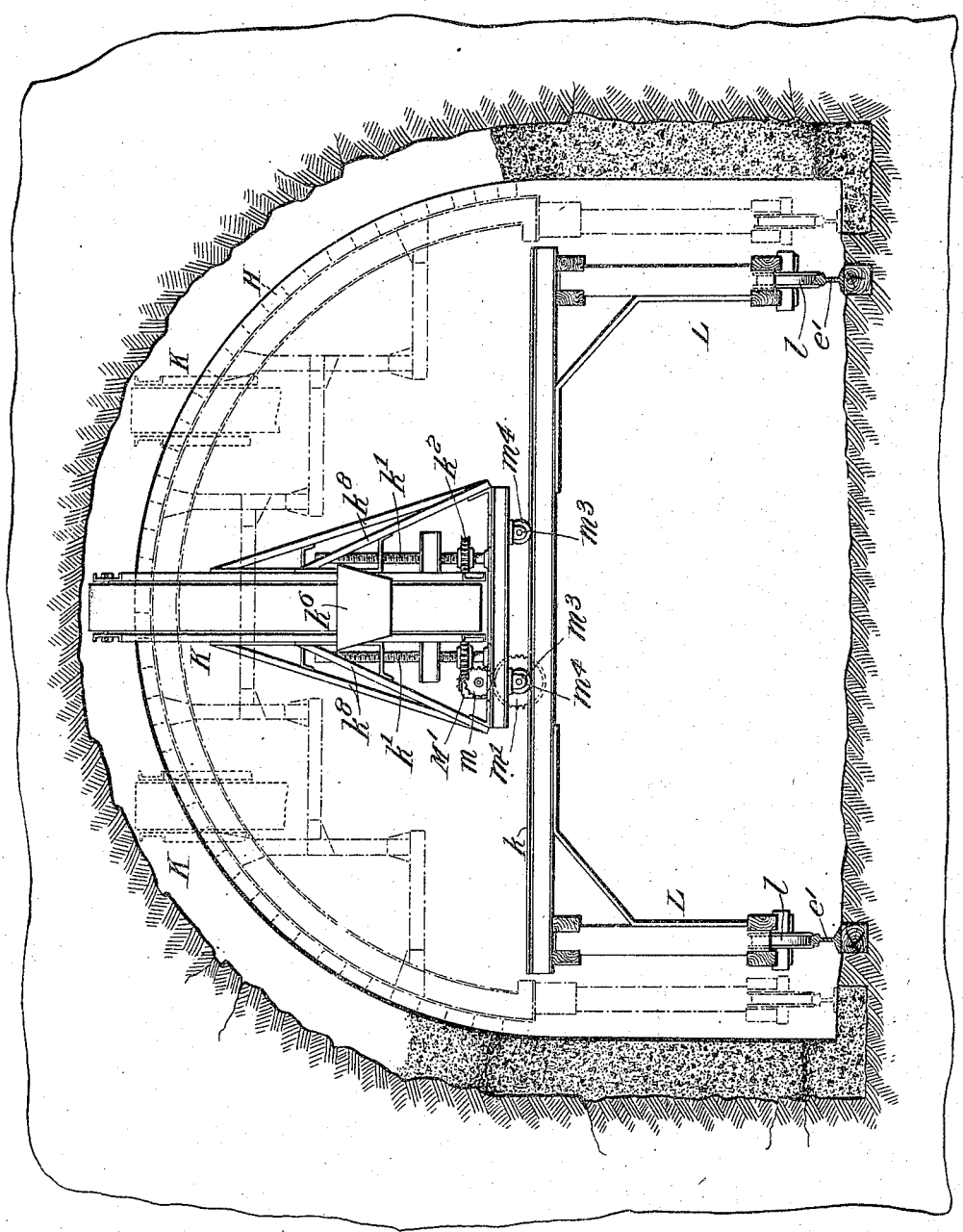

E. G. WILLIAMS & E. H. BROWN.
METHOD OF AND APPARATUS FOR TUNNEL WORK.
APPLICATION FILED JULY 15, 1907.
1,156,830.
Patented Oct. 12, 1915.
14 SHEETS—SHEET 8.
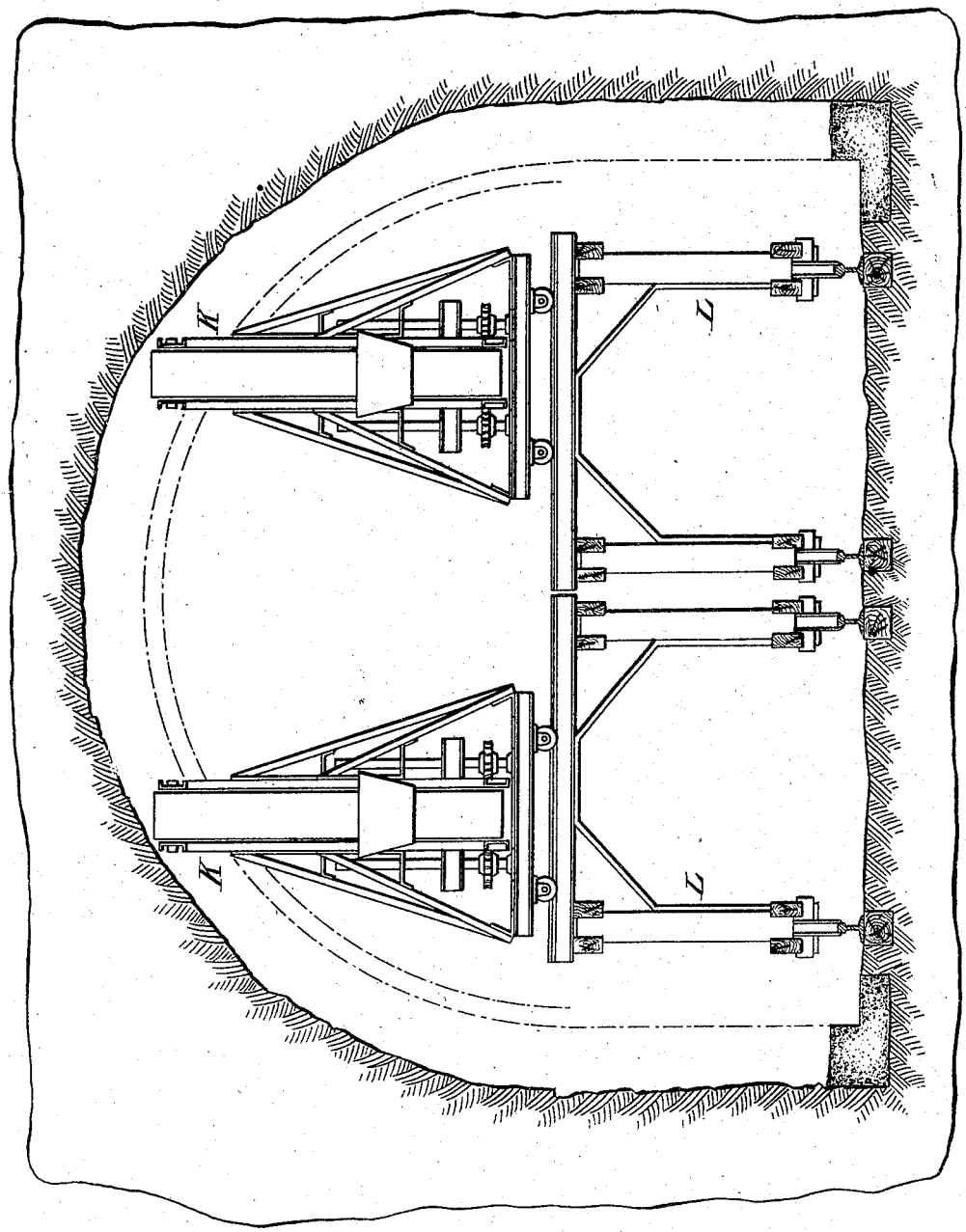

E. G. WILLIAMS & E. H. BROWN.
METHOD OF AND APPARATUS FOR TUNNEL WORK.
APPLICATION FILED JULY 15, 1907.
1,156,830.
Patented Oct. 12, 1915.
14 SHEETS—SHEET 9.
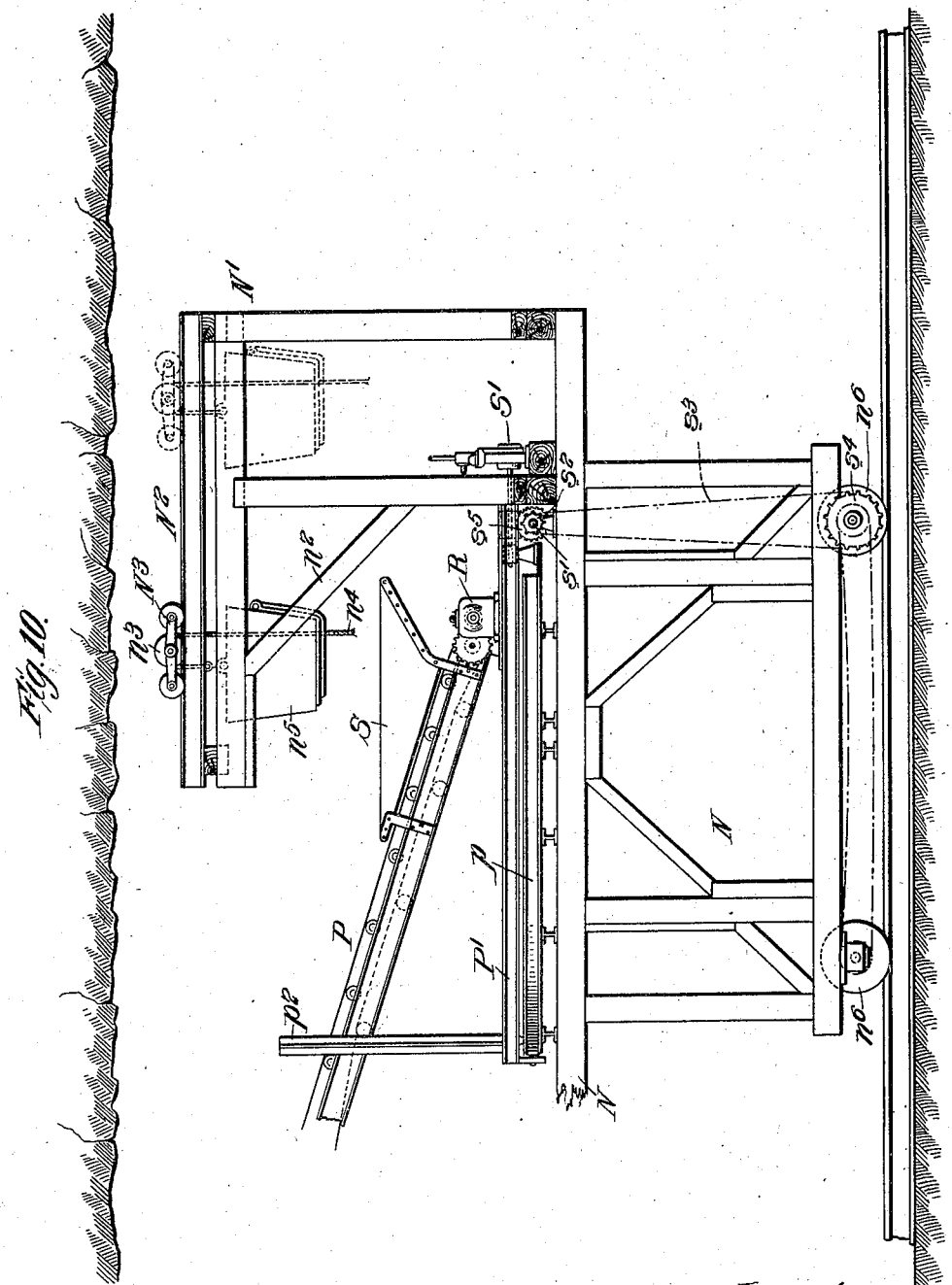

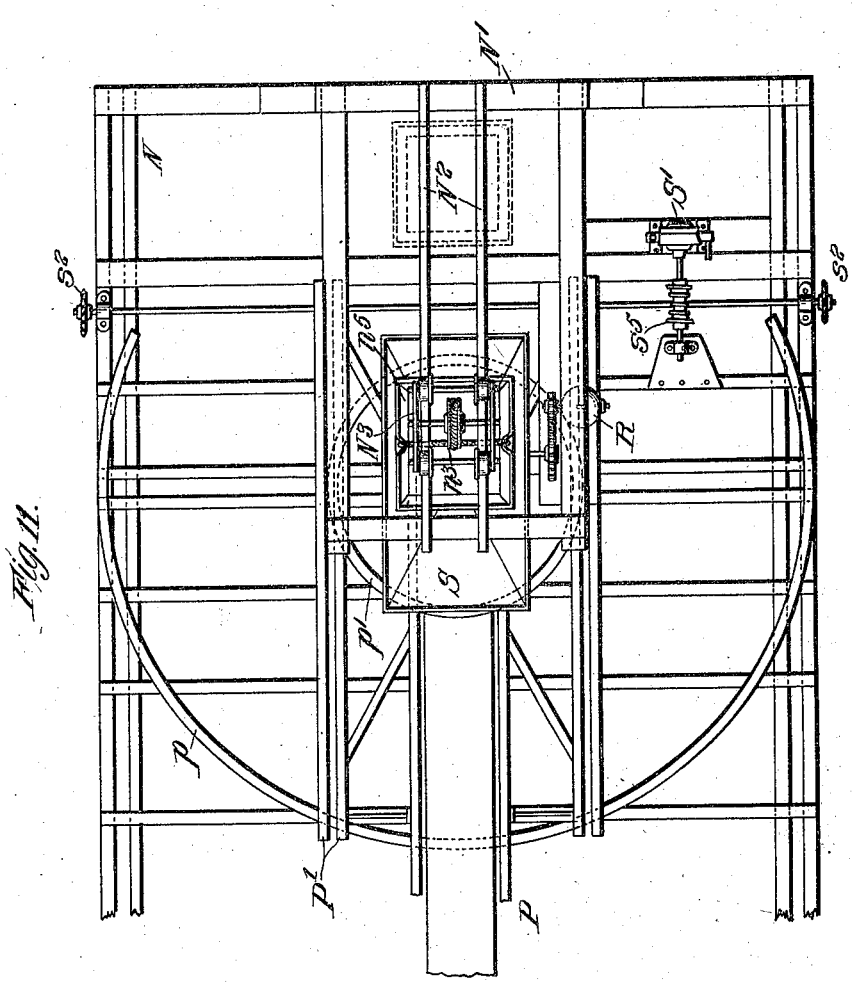

E. G. WILLIAMS & E. H. BROWN.
METHOD OF AND APPARATUS FOR TUNNEL WORK.
APPLICATION FILED JULY 15, 1907.
1,156,830.
Patented Oct. 12, 1915.
14 SHEETS—SHEET 11.
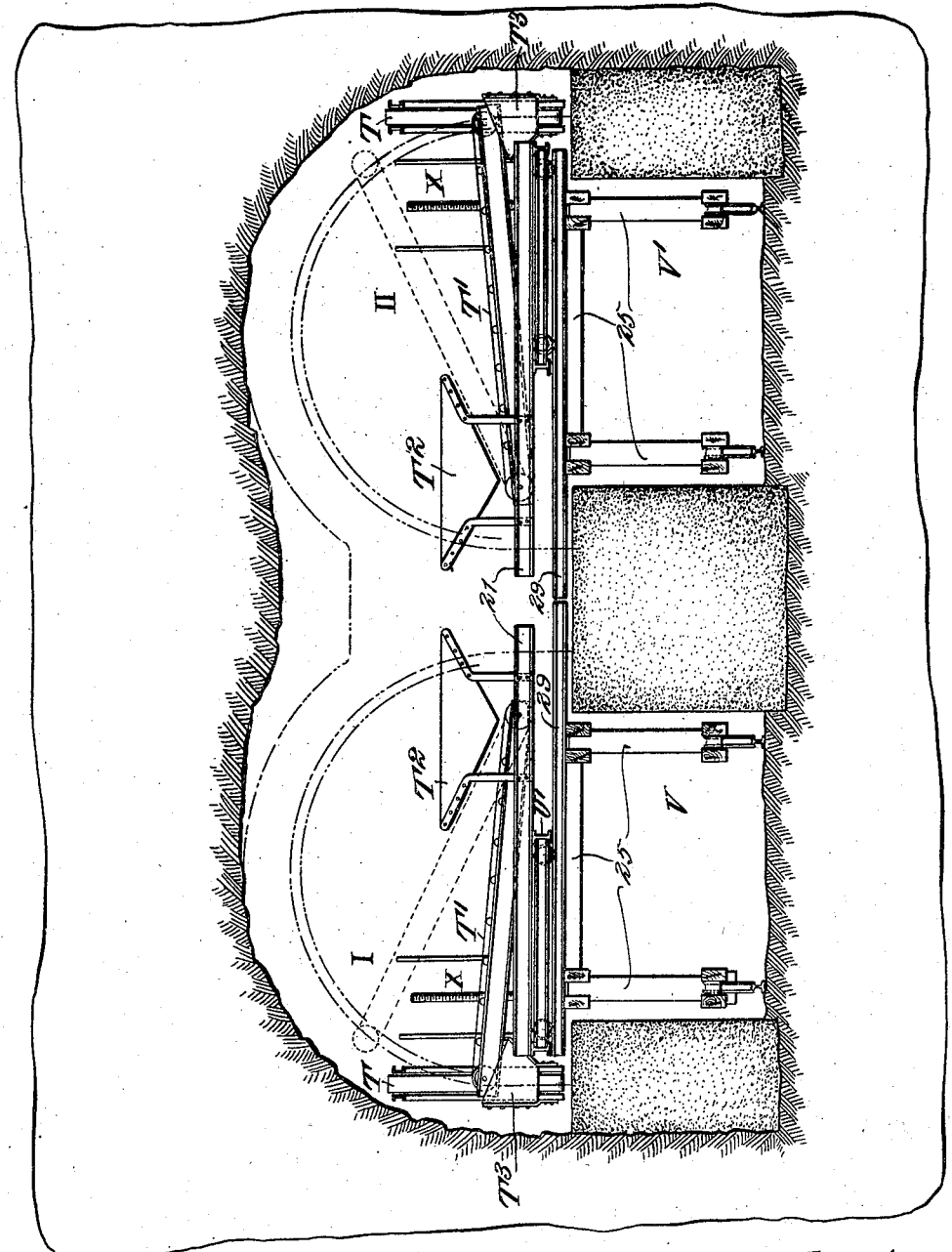

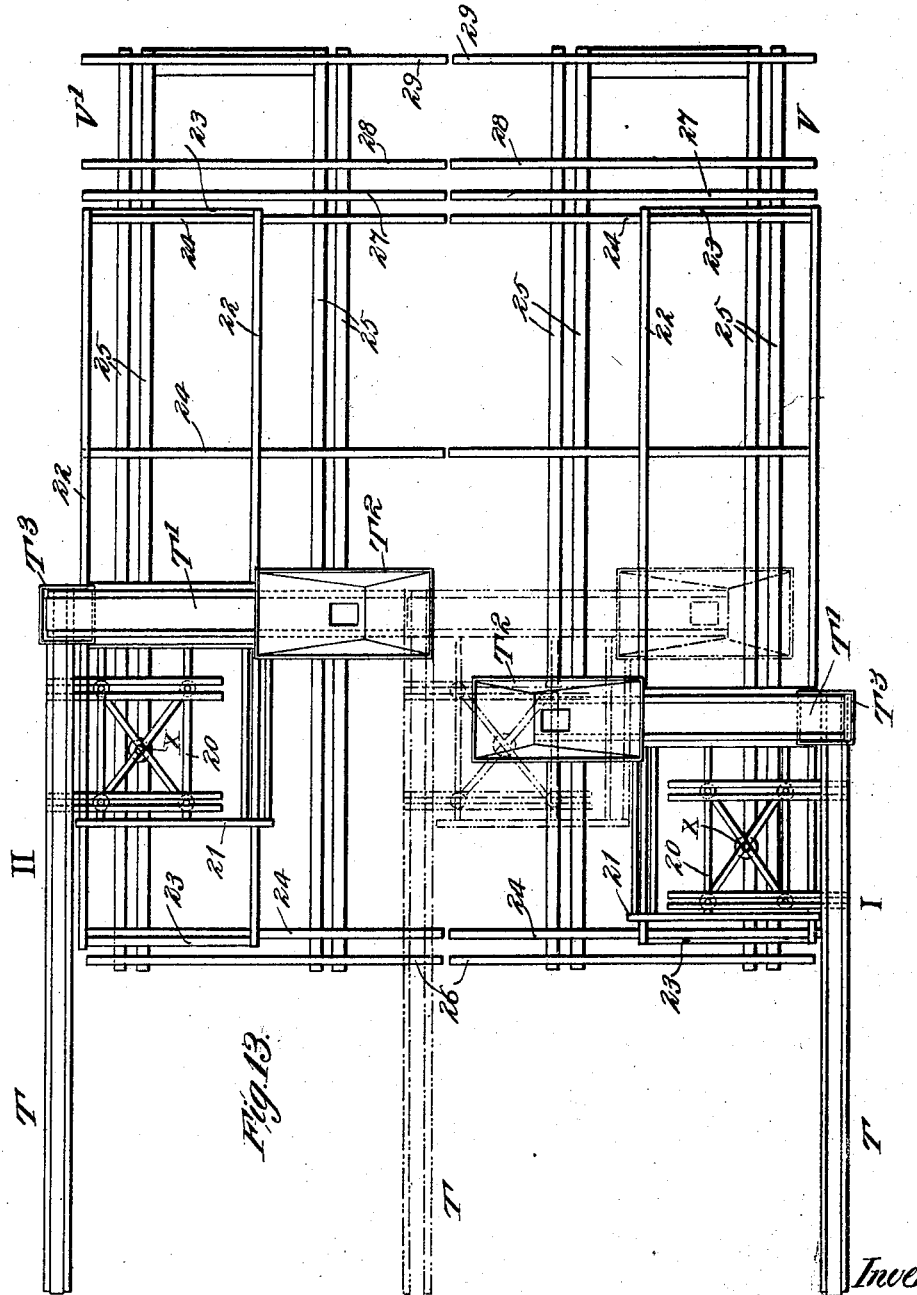

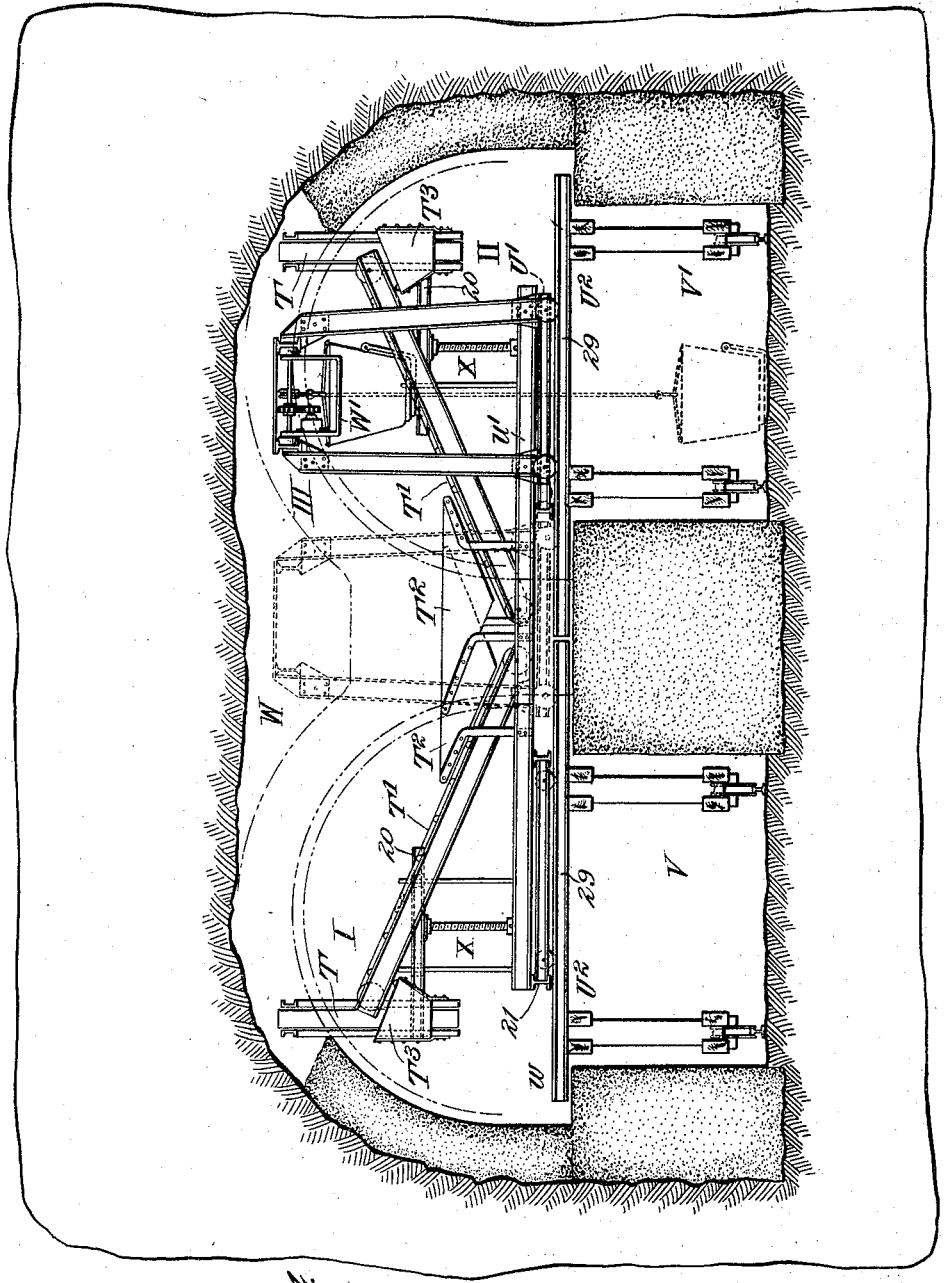

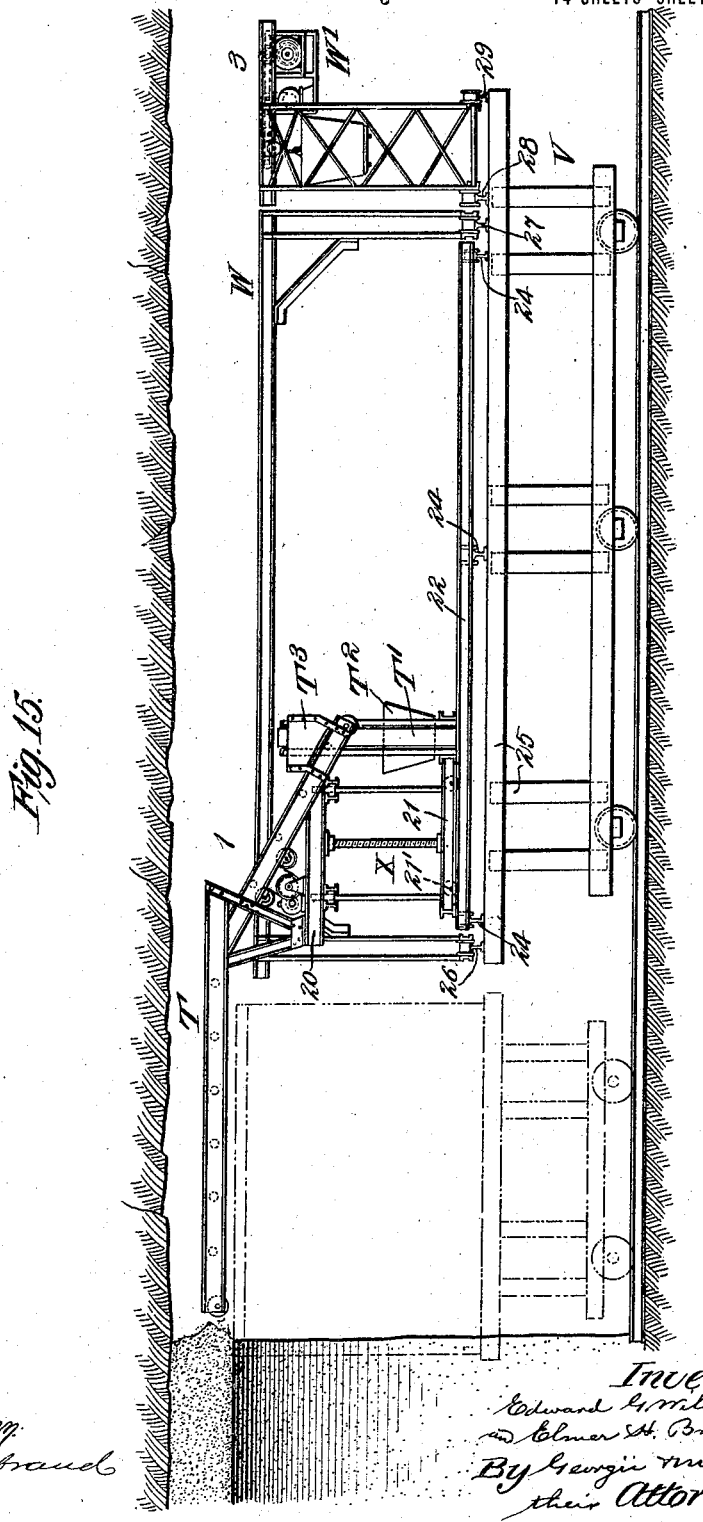

UNITED STATES PATENT OFFICE.

EDWARD G. WILLIAMS AND ELMER H. BROWN, OF WASHINGTON, DISTRICT OF COLUMBIA.

METHOD OF AND APPARATUS FOR TUNNEL-WORK.

1,156,830.  Specification of Letters Patent.  Patented Oct. 12, 1915.

Application filed July 15, 1907. Serial No. 383,929.

*To all whom it may concern:*

Be it known that we, EDWARD G. WILLIAMS and ELMER H. BROWN, citizens of the United States, residing at Washington, in the District of Columbia, have invented certain new and useful Improvements in Methods of and Apparatus for Tunnel-Work; and we do hereby declare the following to be a full, clear, and exact description of the invention, such as will enable others skilled in the art to which it appertains to make and use the same.

Our invention relates to improvements in apparatus for placing concrete and the like in tunnel work.

In particular our invention relates to improvements in the general type of apparatus disclosed in our Patent No. 829903, issued August 28, 1906.

The object of our invention is to provide an apparatus by means of which not only the concrete arch but also the side walls may be constructed with the maximum rapidity, while at the same time allowing sufficient time for the setting of the concrete before removing the forms.

The general nature of our invention will be apparent from the detailed description hereinafter of our preferred embodiment of the invention, and from the claims.

In the drawings Figure 1 is a side elevation of a side-wall form in place in a tunnel, which is indicated in section; Fig. 2 a transverse section of the tunnel showing two side forms in end elevation; Fig. 3 a detail view of a part of one of the side forms. Fig. 4 a side elevation of an arch form; Fig. 5 an end elevation of the same in place in a tunnel; Fig. 6 a side elevation of a machine for placing material in the tunnel arch; Fig. 7 a plan of the same; Fig. 8 an end view of the same; Fig. 9 an end view of a modified arrangement employing two placing devices; Fig. 10 a side elevation of a machine for supplying and placing concrete; Fig. 11 a plan of the same; Figs. 12 to 15 views of a further embodiment of some features of our invention.

A plant embodying our invention in all its details comprises a pair of traveling side-wall forms, an arch-concrete placing apparatus, and a combined concrete supplying and placing apparatus. The latter apparatus has a double function, in that at times it supplies concrete to the arch-concrete placing apparatus and again it may be used to place concrete in the side walls of the tunnel, as will be clear from the description hereinafter.

*The traveling side wall forms.*—The side wall forms, Figs. 1 and 2, are practically alike in construction with the exception that one is a right and the other a left. A description of one will suffice for a full understanding of both, and hence the specific description of the right hand side form shown in Fig. 2, will be given. This side form comprises a truss-frame A, having grooved rollers $a$ arranged to run upon a rail $a'$ laid along the footing $a^2$ of the tunnel wall, as shown in Fig. 2. Upon the inner side of the truss-frame, that is to say, the side toward the center of the tunnel, are arranged a series of vertical struts B, Fig. 1, each consisting preferably of a pair of channel iron beams suitably secured to the truss-frame with their backs slightly separated. To the outside of the truss-frame is secured the wall-form proper which may be of any desired construction, but preferably consists of a plurality of metal plates $c$ secured to vertical timbers $c'$. The wall form is given a shape corresponding to that of the inner face of the tunnel side-wall, and it is particularly advantageous to have this side-wall form arch inward slightly at the top in order to form the lower portion of the concrete arch lining, thereby giving a better clearance for the arch form, proper, or centering, as will be more fully explained in the description of the traveling arch form. In order to hold the wall-form in place, and at the same time to avoid blocking the tunnel, suitable means for this purpose is provided, said means comprising in tunnels through rock, bolts secured in the rock, as indicated at D D' and arranged to hold the upper and lower portions of the wall forms. The bolts at the upper portion of the wall-forms are provided with eyes into which are hooked suitable hook-bolts $D^2$, whose inner ends are threaded and provided with washers, each hook-bolt passing through the upper end of its respective vertical strut B, in the space between the channel bars forming said strut. The bolts D' at the lower portion of the form pass through holes in the lower part of the wall-form proper, the ends of said bolts being threaded and provided with washers and nuts, as will be clear from Fig. 2.

For the purpose of allowing the ready transportation of the side-wall forms from one location to the next, a plurality of swinging braces, E, are hinged to the vertical struts, these swinging braces being provided at their lower ends with rollers, $e$, which are arranged to run upon a rail $e'$, laid on the tunnel floor. In order to move the swinging braces inward to bring the rollers into contact with the corresponding rail $e'$ or outward so as to be flat against the side wall-form, and to hold the braces in any position to which they may be adjusted, suitable means is employed, for example, jack-screws $e^2$, Fig. 3, connected to the braces and to the truss-frame A. In using this side-wall form the lower bolts $D'$ are put in place when the footing of the side-wall is laid, which is done prior to the use of the side-wall forms. The upper eye-bolts D are set in holes drilled into the solid rock, being held by expansion bolts in a well known manner. The side-wall form is run along its tracks $a'$ $e'$ to the desired location, the swinging braces E being swung inward so that their rollers $e$ will move upon the rail $e'$. The hook bolts $D^2$ are brought into engagement with the eye-bolts D, the bolts $D'$ are connected at the bottom and the form thereby drawn into place. The swinging braces may then be swung back flat against the inner face of the form, if desired, where they are held by the jack-screws $e^2$. The form is now ready for placing of concrete, which can be done in any suitable way, but preferably by means of the concrete-supplying and placing apparatus hereinafter described. So soon as the concrete is set, the swinging braces E are moved inward at the bottom by means of the jack-screws, and the bolts are loosened, thus letting the weight of the form rest upon the two rails, $a'$, $e'$. The hook bolts are then unhooked from the eye-bolts and the side-wall form can be pushed along to its next location where it is again fixed in place in the manner hereinbefore described.

*The traveling arch form.*—This comprises two side trusses, F, Figs. 4 and 5, mounted on rollers $f$ arranged to run upon the rails $a'$ located at the bottom of the tunnel upon the footings of the side walls. Upon these side trusses F is mounted an arch form or centering, consisting of arched structural iron or steel ribs G, each having its ends connected by a tie-rod $g$ provided with a suitable adjusting means such as a turn-buckle $g'$. Each rib G is trussed by a plurality of horizontal and vertical braces $g^2$ as indicated in Fig. 5 so as to leave plenty of clearance through the center of the arch-form, this form of bracing or trussing of the arched ribs being particularly advantageous for the reason that the horizontal members serve to support stagings for the workmen. The ribs G are covered with lagging H, and are supported upon longitudinal girders I. Between these girders and the top sill of the side trusses F are provided means for bodily raising and lowering the arch form, this means comprising jacks indicated at $i$. For the purpose of holding the arch form steadily and to assist in bringing the arch form into its correct operative position, wedge blocks $i'$ $i^2$ and bearing blocks $i^3$ are provided between the top sills, of the side trusses F and the longitudinal girders I, these wedge-blocks being held against lateral displacement by tongue and groove connections with each other and with the respective bearing blocks $i^3$ above and below them, as will be clear from Fig. 5. In order to hold the wedge-blocks of a pair in the proper relation to each other when the arch form is adjusted by the jacks $i$ to its proper height, the lower block $i^2$ of each set has a hook $i^4$ which engages a pin $i^5$ in its companion block. When the arch form is raised until it is possible to lock each hook $i^4$ over its corresponding pin $i^5$ the arch form is known to be at its correct height, assuming of course that the rails $a'$ are at the proper grade. Since these rails rest upon the concrete footings of the side walls, as indicated in Figs. 2 and 5, and as these footings are usually surfaced carefully on top, the rails $a'$ are laid to the proper grade without difficulty. When the concrete placed upon the arch form has set and it is desired to advance the form, the hooks $i^4$ may be released from their pins $i^5$, the wedge blocks loosened and the jacks lowered, thus lowering the arch form and freeing it from the concrete lining. Thereupon the whole arch form is moved forward to the next location where it is again raised to place by the jacks, the wedge blocks driven up and the hooks latched over the pins. As the concrete which is put in place by the aid of the side wall forms includes the lower part of the concrete arch, there is no difficulty in clearing the arch form from the set concrete above it when lowering the form. The turn-buckles $g'$ in the tie rods $g$ are provided, as a matter of precaution to permit slight adjustments in the width of the arch form to be made readily, and to enable the arch form to be drawn in slightly at the bottom, which its elasticity will permit, in order to free it from the concrete in case it should stick.

From Fig. 5 it will be seen that the central portion of the trussing is so arranged that by removing two bolts, the central dependent brace and the two horizontal braces connected with the bottom of the dependent brace may be swung to one side, as shown by the dotted lines, thus leaving a clear head room for a purpose hereinafter explained. Furthermore, the turn-buckle $g'$ may be unscrewed so that the two halves of the tension rod $g$ may be swung to one side, for example, in an upward direction, as indicated in dotted lines in said Fig. 5, in which position the said halves of the tension rod may be secured in any suitable way as by tying. This provision of a truss arranged to be removed out of the center of the arch form, allows the concrete placing machine, when lowered to its lowest position, to pass through the arch-form telescopically. This permits the use of a plurality of arch-forms with each arch concrete placing machine so that instead of waiting thirty-six hours for the concrete to set above one arch form, the arch concrete placing machine can be run ahead, another arch form can be run over it into place and the placing of the concrete over said second arch form can be proceeded with, and so, also, with a third, or a fourth arch form, if desired. Then when the last form has stood thirty-six hours in place for its concrete to set, all the arch forms can be struck and run ahead, this greatly reducing the time necessary for the work.

*The arch concrete placing apparatus.*— This apparatus indicated generally at K, Figs. 6, 7 and 8, is similar to that described in our Patent No. 829903, differing principally in the fact that it need not be made to swing in an arc of a circle, but merely traverses the tunnel on a pair of transverse rails, $k$, laid upon a suitable substructure, L, which may be of any desired construction to hold the machine at the required height for its work. Preferably this substructure is the same as that described in our said patent, being open underneath to form a passage-way for the tunnel traffic, and mounted on rollers or wheels, $l$, which run upon the rails $e'$ on which the side-wall forms run. This arch concrete placing machine can be raised and lowered bodily while maintaining the horizontal discharge portion of its conveyer in a substantially horizontal plane, suitable jack-screws $k'$ being provided for this purpose, these screws being driven by worm-wheels $k^2$ engaged by worms $k^3$ on transverse shafts $k^4$ which shafts are connected for simultaneous movement, as for example, by a sprocket-chain $k^5$. One of the transverse shafts is driven by a suitable motor, for example, an electric motor indicated at M. For the purpose of conveniently moving the machine transversely, a motor M' is provided which has a gear-wheel $m$ engaging a corresponding gear $m'$ on a longitudinal axle $m^2$, journaled in bearings $m^3$ on the underside of the machine frame and having rollers or wheels $m^4$ fixed to it. The machine has a hopper, $k^6$ which receives the concrete, and conveying means, as for example, a belt $k^7$ which carries the concrete up the inclined portion of the conveyer and then along the horizontal portion to the place of discharge over the arch-form. The construction of the frame, the belts and the means for driving the same may be as disclosed in our said patent, and hence need not be specifically described herein.

For the purpose of guiding the machine in its vertical movement when raised or lowered by the jack screws $k'$, suitable guide posts, as indicated at $k^8$, may be secured to the machine base as shown in Fig. 6. The method of operating this device is as follows: The arch-form being in place, the machine is moved toward the arch form until the horizontal portion of its conveyer extends into the space between the arch-form and the tunnel roof, as shown in Fig. 6. Owing to the fact that the machine can be raised or lowered, and can travel laterally, the horizontal portion of its conveyer can follow the curve of the arch and thus can be adjusted to discharge at any point over the arch form, thereby delivering the concrete to the desired place with the minimum amount of handling. In wide tunnels and where great rapidity of construction is desirable, two such arch-concrete placing machines may be employed, these two being fed from a common supplying apparatus, as for example, the concrete supplying and placing apparatus hereinafter described. In Fig. 9 is shown a substructure provided with two such arch-concrete placing devices, these being intended to work each at its own side of the arch in a direction toward each other, until the machines meet, whereupon one machine is withdrawn, and the other used to complete the central portion of the arch. With this construction the substructure is made in two parts, each part being capable of movement longitudinally of the other part. In this case, of course, the tunnel is assumed to be wide enough to allow traffic tracks through each substructure, since if it were not this wide there would be no need for two arch-concrete placing machines.

*The combined concrete supplying and placing apparatus.*—This comprises an elevating mechanism and a concrete conveying mechanism mounted in such a manner as to be out of the way of the traffic through the tunnel. In the embodiment shown, in Figs. 10 and 11, taken with Figs. 6 and 7, the said apparatus is mounted in a substructure similar to that employed with the arch-concrete placing apparatus and arranged to be detachably coupled to the latter when desired, as, for example, by means of bolts $n$ Fig. 6, which pass through a transverse girder $l'$ on the front of the substructure L of the arch-concrete placing device and through a similar girder $n'$ on the rear end of the substructure N. The front end of the substructure for the combined concrete supplying apparatus is arranged to overhang somewhat as shown in Fig. 10, and on the upper side of this overhanging part is mounted a frame-work N' carrying a rearward projecting overhead track $N^2$ which has an overhanging part which may be suitably braced as shown in Fig. 10 by braces $n^2$. On this overhead track moves a carriage $N^3$ to which the hoisting device is attached, this being shown conventionally in the drawing as an ordinary pulley $n^3$ and rope $n^4$ arranged to hoist a bucket $n^5$. In practice the hoisting device is similar to that shown in our Patent 829903. The conveying apparatus consists of a belt conveyer P, arranged to swing vertically and mounted on a turn-table platform P', provided with rollers running on curved rails $p\ p'$, Fig. 11 carried by the substructure N. The conveyer is guided in its vertical movements by posts, $p^2$ secured to the turntable platform. The conveyer belt is driven by a motor R, in the usual way. Above the lower end of the conveyer and over the center of the turntable, is mounted a hopper S, above which terminates the overhanging portion of the overhead track of the elevating apparatus so that the bucket $n^5$ may be discharged into the hopper. For the purpose of moving the substructure longitudinally on the tunnel tracks, a motor, S', is provided, this being mounted on the substructure as shown and arranged to drive a transverse shaft $s'$ which is provided at each end with sprocket wheels $s^2$ which are connected by sprocket chains $s^3$ to sprocket wheels $s^4$ fixed to the track wheels $n^6$ of the substructure, as will be clear from the drawings. In the embodiment shown, the motor for propelling the substructure is a compressed air motor, and this is coupled to the transverse shaft $s'$ by a worm gear indicated at $s^5$.

The apparatus just described has two functions, viz. to place concrete in the side walls of the tunnel and to supply concrete to the arch-concrete placing apparatus. Owing to the fact that the conveyer is angularly adjustable, that is to say, can be swung in an arc in a horizontal direction and also can be adjusted at different angles in a vertical plane it can follow the hopper of the arch-concrete placing apparatus and thus permits the latter apparatus to be moved freely from one position to another transversely, while maintaining a supply from the elevating or hoisting apparatus which of necessity is arranged over the tunnel tracks. The hopper S of this combined device is made large enough to act as a storage receptacle for a short interval, thus maintaining the plant in operation continuously although fed from an intermittent source of supply. In placing concrete for the side-walls, the conveyer is swung to the desired side and discharges the concrete back of the side wall forms. During this work this apparatus is not bolted or otherwise connected to the substructure of the arch-concrete placing apparatus, and being furnished with its own means of propulsion can be readily and quickly moved along its track to discharge at any desired point behind the said side wall forms. Moreover, it can be swung from one side to the other by hand so that it can work on either side wall.

In the use of a plant embodying our invention, the concrete footings for the side walls are first put in place in any desired way, preferably, however, by shoveling the material directly from cars on the tunnel traffic tracks to low forms of the usual construction. Then the side-wall forms are put in place and the combined concrete-placing and supplying apparatus is moved into place and set in operation to build the side walls. Then the side wall forms are moved farther into the tunnel to their next location and the side walls completed at such new location. Next, the arch-concrete placing apparatus is run into the tunnel and behind it the arch-form. The combined concrete placing and supplying apparatus can now feed the arch concrete placing apparatus, which places the concrete of the arch, while sections of the side walls which are within the side-wall forms are setting. As soon as the arch-concrete has been placed, and while the same is setting, the side-wall forms can be moved ahead to the next section and the combined placing and supplying apparatus brought into operation to build the new section of side walls, during which time the concrete arch is setting. At the end of this time the arch form is lowered and moved ahead to the next section, then raised into place and the work of building the new section of the arch may be proceeded with. It will be seen that by the use of this plant, the work can be carried on rapidly while at the same time the concrete is given sufficient time to set before the forms are moved.

In Figs. 12 to 15 is illustrated another structure embodying some of the features of the invention. Referring to these figures, it will be observed that the embodiment of our invention therein illustrated comprises two concrete placing devices indicated generally by the Roman numerals I and II, and common means for supplying both of said concrete-placing devices, this being indicated generally at III. Each concrete-placing device comprises a conveyer T extending in the direction of the length of the tunnel and having a horizontal section and an inclined section, and a conveyer T' extending transversely to the axis of the tunnel, this conveyer discharging into a hopper $T^3$ at the lower end of the inclined section of the longitudinal conveyer and having a hopper T² of its own through which it is fed. The concrete placing device is provided with a suitable frame-work 20 by means of which the parts are held in proper relation to each other, the frame-work being mounted on a super-carriage 21 which can move on wheels 21' in the direction of the length of the tunnel upon rails 22, tied together by members 23 and constituting a traversing carriage which can move transversely of the tunnel upon transverse tracks 24 carried upon a suitable substructure 25. In the preferred embodiment of our invention, this substructure consists of two parts, indicated generally at V and V' each of which is similar to the substructure described in our said patent in that it is arranged so as to provide a passage way for the traffic over the tunnel track which it bridges. In the example illustrated, the substructure may be considered as comprising two traveling platforms, or frame-work each mounted upon tracks in its respective tunnel-tube so that it may be moved in the direction of the length of the tunnel. The traveling platforms also carry transverse rails 26, 27, 28, 29 upon which the concrete supplying apparatus runs. The concrete supplying apparatus comprises a hoisting and conveying device, formed of two separably movable parts, one W of which is a transversely movable overhead track-device, and the other W' a transversely movable traveling hoist mechanism. The overhead track device W is supported for transverse movement on the substructure by wheels or rollers running on tracks 26, 27; while hoist mechanism W' is similarly supported on tracks 28, 29. The rails on which the overhead track device travels are outside the tracks upon which travel the concrete-placing devices, and the said overhead track device is located between the two concrete placing devices, being high enough to bridge all the mechanism of the latter except the concrete-placing conveyers. All the tracks carried by the two platforms are in two sections, one section being carried by each platform, so that the said platforms may be moved independently of each other and when brought side by side in alinement, the overhead track device, the hoist mechanism, and the concrete-placing devices may be moved as desired along the respective tracks. The intermediate portions of the said tracks overhang the respective portions of the substructure and may be supported by temporary blocking or posts, or generally by the center wall of a twin tube tunnel, when used in such a place.

The operation of this device is as follows: The concrete brought into the tunnel over the usual tunnel tracks is lifted in buckets from the cars on said tracks by the hoist mechanism. As this can travel transversely of the tunnel it can lift the buckets from either tunnel tube and can travel laterally of the tunnel until its overhead track or runway is in line with the track of the overhead track device. Then the bucket, which is supported by a traveler in the usual way, can be moved longitudinally of the tunnel along the overhead track, which is adjustable laterally so that it may deliver the bucket over either hopper of the respective concrete-placing devices, whereupon the bucket is discharged and returned to the hoist mechanism, which then is actuated to lower the bucket to the car on the respective tunnel track. The transversely arranged conveyers of the concrete-placing devices deliver the concrete to the hoppers of the longitudinally arranged conveyers, from whence it is removed by said latter conveyers and discharged at the desired points. The concrete placing devices have means for vertically adjusting the longitudinally arranged conveyers, as for example, the jacks indicated at X. Furthermore, the transversely arranged conveyers are arranged to swing in a vertical plane and have a limited amount of movement together with their hoppers in a direction transverse to the tunnel so that as the longitudinally arranged conveyers are adjusted vertically, the discharge ends of the respective transverse conveyers may be kept over the hoppers of said longitudinally arranged conveyers.

Having thus fully described our invention, what we claim, is:—

1. In a machine for tunnel work, the combination, with an arch form and a side-wall form, of an arch-concrete placing device arranged to place material over the arch-form, and an angularly movable conveyer arranged to supply material to the arch-concrete placing device and to the side-wall form.

2. In a machine for tunnel work, the combination, with an arch form, and a side-wall form, of an arch-concrete placing device arranged to place material over the arch form, and a concrete supplying mechanism arranged to supply material interchangeably to the arch-concrete placing device and to the side-wall form.

3. In a machine for tunnel work, the combination, with an arch form, and a pair of side-wall forms, of an arch-concrete placing apparatus mounted between the side-wall forms and arranged to place material over the arch-form, and an angularly movable concrete supplying mechanism arranged to supply material interchangeably to either side-wall form and also to the arch-concrete placing device.

4. In apparatus for constructing tunnels, the combination of an arch form, side-wall forms arranged in advance of the arch form, a concrete-placing mechanism arranged to place material over the arch form, a conveyer, and means for imparting an angular movement to the conveyer whereby it may supply material to the concrete placing mechanism or behind the side forms.

5. In apparatus for constructing tunnels, the combination of parallel tracks, an arch form arranged to travel on the outer tracks, a concrete-placing mechanism arranged to travel on the inner track, and to supply material over the arch form, and side forms arranged to travel on one rail each of both tracks.

6. In a machine for tunnel work, the combination, with an arch form, frames upon which said arch form is supported, and tracks upon which said frames move, of a concrete placing device arranged to place concrete over the arch form, a substructure upon which said device is supported and tracks upon which said substructure runs, said tracks being substantially parallel to the first tracks, and a side form arranged to run upon one rail each of both tracks.

7. In a machine for tunnel work, the combination, with an arch form, frames upon which said arch form is supported, and tracks upon which said frames move, of a concrete placing device arranged to place concrete over the arch form, a substructure upon which said device is supported and tracks upon which said substructure runs, said tracks being substantially parallel to the first tracks, a side form arranged to run upon one rail each of both tracks, and a conveying mechanism arranged to deliver concrete to the arch-concrete placing device and to the side form.

8. In an arch form, the combination, with arched ribs and adjustably tensionable tie-rods connecting the ends of said ribs, of a truss bracing composed of a plurality of horizontal and vertical members, the vertical members having their upper ends secured to the said ribs, the lowest horizontal members having their opposite ends secured to the ribs and to the lower ends of the lowest vertical members, and the intermediate horizontal members having their opposite ends secured to the lower end of one vertical member and to an intermediate point of the length of the adjacent vertical member.

9. A side-wall form comprising a frame, swinging braces connected to said frame, means for holding the braces at any desired angle to the frame, and rollers upon the frame and braces arranged to run upon parallel tracks.

10. The combination, with a pair of side-wall forms having curved upper ends, to form the lower portion of the arch, and a carriage for supporting and transporting said form, of an arch form arranged to form the remainder of the arch, and means independent of the side-wall form and its carriage for supporting and transporting said arch form.

11. In apparatus for building tunnels, the combination of a traveling concrete-placing mechanism, and a series of traveling forms arranged to move telescopically past the said placing mechanism and be successively secured in position to receive material therefrom.

12. In apparatus for building tunnels, the combination of a traveling concrete-placing mechanism, and a series of traveling arch forms, each having truss bracing so arranged as to provide clear head room whereby the said forms may be moved telescopically past the placing mechanism and be successively brought into position to receive material therefrom.

13. In apparatus for building tunnels, the combination of a concrete-placing mechanism, means for adjusting said mechanism whereby it may extend either over or below an arch form, and a traveling arch form arranged to move telescopically past said placing mechanism and be secured in position to receive material therefrom.

14. In a machine for tunnel work, the combination, with an arch form and a side wall form arranged in advance of the arch form, of a vertically and laterally movable concrete placing device arranged to place material over the arch form, and a concrete supplying mechanism arranged to supply material interchangeably to the side wall form and to the arch concrete placing device in any adjusted position of the latter.

15. In a machine for tunnel work, the combination, with an arch-form, frames upon which said arch-form is supported, and a concrete-placing device arranged to place concrete over the arch-form, said concrete-placing device being arranged to receive materials at a point below the top of the arch-form, of a substructure on which said concrete-placing device is mounted, side-wall forms having the concrete-receiving openings in a horizontal plane above the spring of the arch-form, and an angularly movable concrete conveying device arranged to supply material to the concrete placing device, and to the side wall forms.

16. In a machine for tunnel work, the combination, with an arch-form, frames upon which said arch-form is supported, and tracks upon which said frames move, of a concrete-placing device arranged to place concrete over the arch-form, a substructure upon which said device is supported, tracks upon which said substructure runs, said tracks being substantially parallel to the first tracks, a side-wall form arranged to run upon one rail each of both tracks, and conveying means mounted upon the substructure and arranged to move into position to discharge material into the side-wall form and also to move into position to supply material to the concrete placing device.

17. In apparatus for building tunnels, the combination, with a portable arch form mounted to remain at a substantially constant but slightly adjustable height, of concrete-placing mechanism, and means operable both to elevate said concrete-placing mechanism into position to place material upon said arch form, and to lower said mechanism so that said arch form can be moved over and past said mechanism.

18. The method of lining a tunnel arch with concrete which comprises placing an arch form in the tunnel in position to receive concrete, filling the space over the form with concrete by means of a concrete-placing apparatus, lowering said apparatus, moving a second arch form from the unlined portion of the tunnel over the lowered placing apparatus and into abutment with the first arch form, moving and elevating said placing apparatus and filling the space over the second arch form with concrete, repeating the described operations with any desired number of arch forms moved successively over the placing apparatus, discontinuing operations long enough to allow the concrete over the last arch form to set, striking all the arch forms and advancing all but the first of the series over the lowered placing apparatus into the unlined portion of the tunnel, and repeating the entire cycle of operations as before.

In testimony whereof we hereunto affix our signatures in the presence of two witnesses.

EDWARD G. WILLIAMS.
ELMER H. BROWN.

Witnesses:
CHARLES W. ALLEN,
TOWNSEND D. COCK.

Copies of this patent may be obtained for five cents each, by addressing the "Commissioner of Patents, Washington, D. C."